United States Patent [19]

Letourneur

[11] Patent Number: 5,681,257

[45] Date of Patent: Oct. 28, 1997

[54] CENTRIFUGE WITH REMOVABLE ROTOR AND DEVICE FOR AXIAL IMMOBILIZATION OF THE ROTOR ON THE DRIVE SHAFT

[75] Inventor: Jean-Claude Letourneur, Nantes, France

[73] Assignee: Jouan, Saint-Nazaire, France

[21] Appl. No.: 560,620

[22] Filed: Nov. 20, 1995

[30] Foreign Application Priority Data

Nov. 21, 1994 [FR] France ................... 94 13904

[51] Int. Cl.$^6$ ............................................. B04B 9/04
[52] U.S. Cl. ................... 494/12; 494/16; 494/84; 403/325; 403/327
[58] Field of Search ....................... 494/12, 16, 20, 494/82, 83, 84, 85, 7; 403/325–328, 383

[56] References Cited

U.S. PATENT DOCUMENTS

| | | | |
|---|---|---|---|
| 2,865,662 | 12/1958 | Nurmse | 403/325 X |
| 3,676,723 | 7/1972 | Drucker | 494/7 X |
| 4,897,075 | 1/1990 | Sharples | 494/84 |
| 5,342,282 | 8/1994 | Letourneur | 494/16 X |
| 5,443,438 | 8/1995 | Wright et al. | 494/16 X |
| 5,456,653 | 10/1995 | Wright | 494/84 X |

FOREIGN PATENT DOCUMENTS

| | | |
|---|---|---|
| 36013 | 11/1965 | Germany . |
| 2722322 | 11/1978 | Germany . |
| 1588373 | 2/1978 | United Kingdom . |
| WO83/04379 | 12/1983 | WIPO . |

*Primary Examiner*—Charles E. Cooley
*Attorney, Agent, or Firm*—Larson and Taylor

[57] ABSTRACT

The centrifuge includes a drive shaft (3), a rotor (1) which can be mounted removably on the drive shaft, and a device (6) for providing axial immobilization of the rotor (1) with respect to the shaft (3). This device includes a male element (10) loaded elastically and capable of interacting with a recess (11) of the shaft (3), and it is characterized in that the male element (10) is mounted on the rotor (1) and that an unlocking device (12) which can be actuated from the outside of the rotor and allow the said male element (10) to be placed in a position disengaged from the female element (11) are provided.

13 Claims, 5 Drawing Sheets

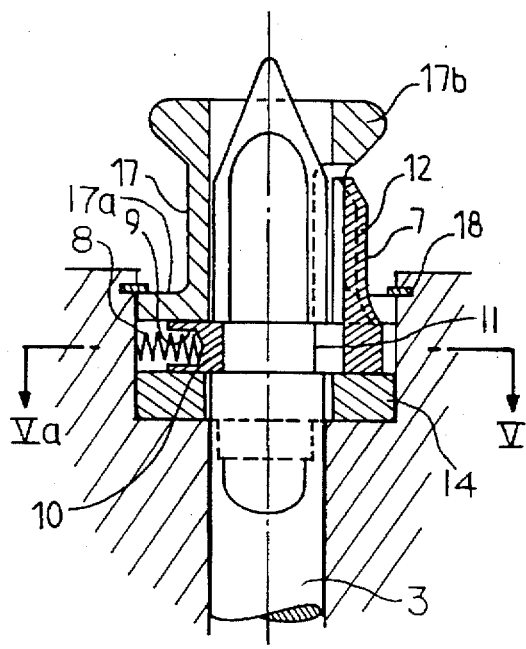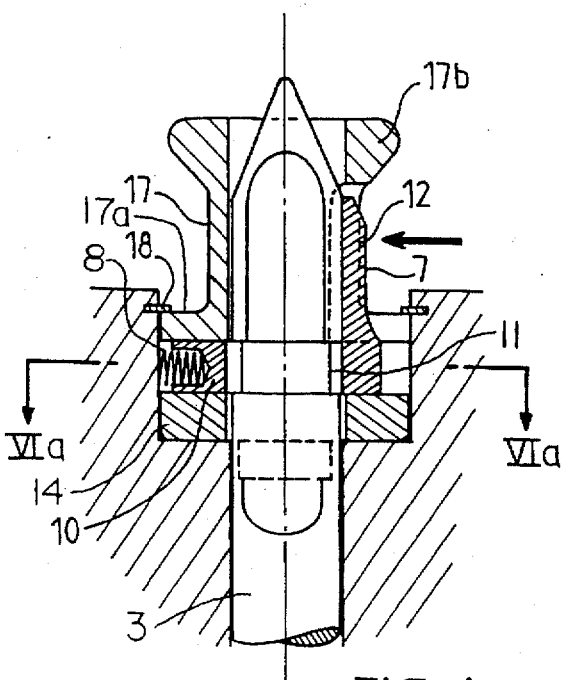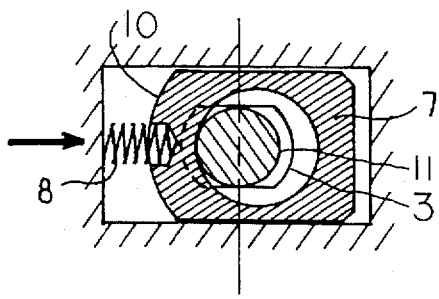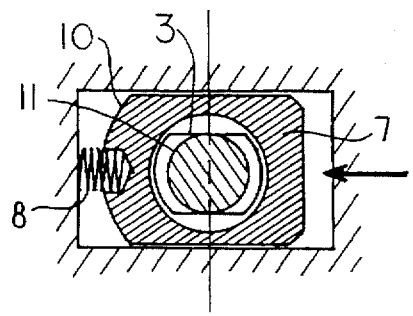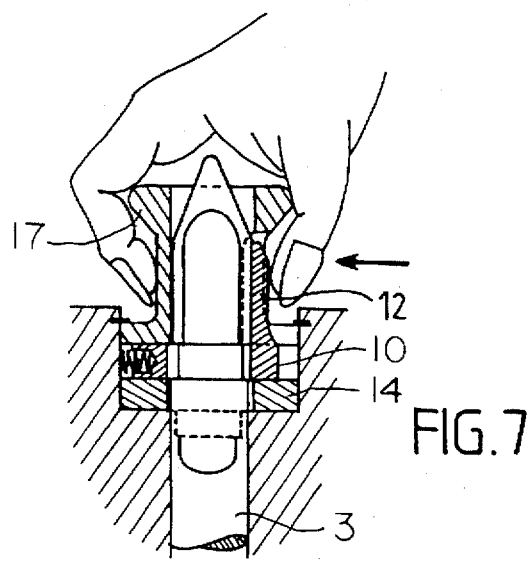

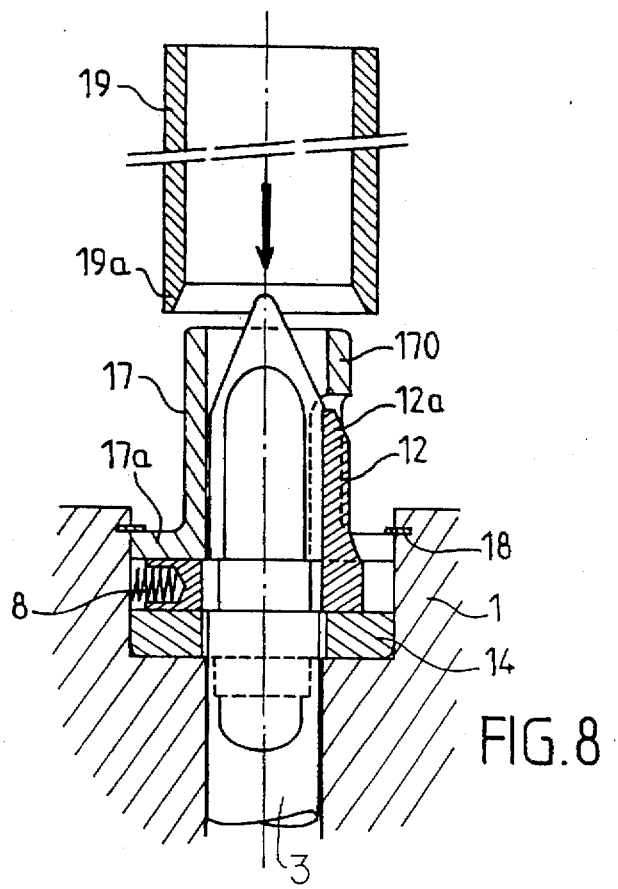
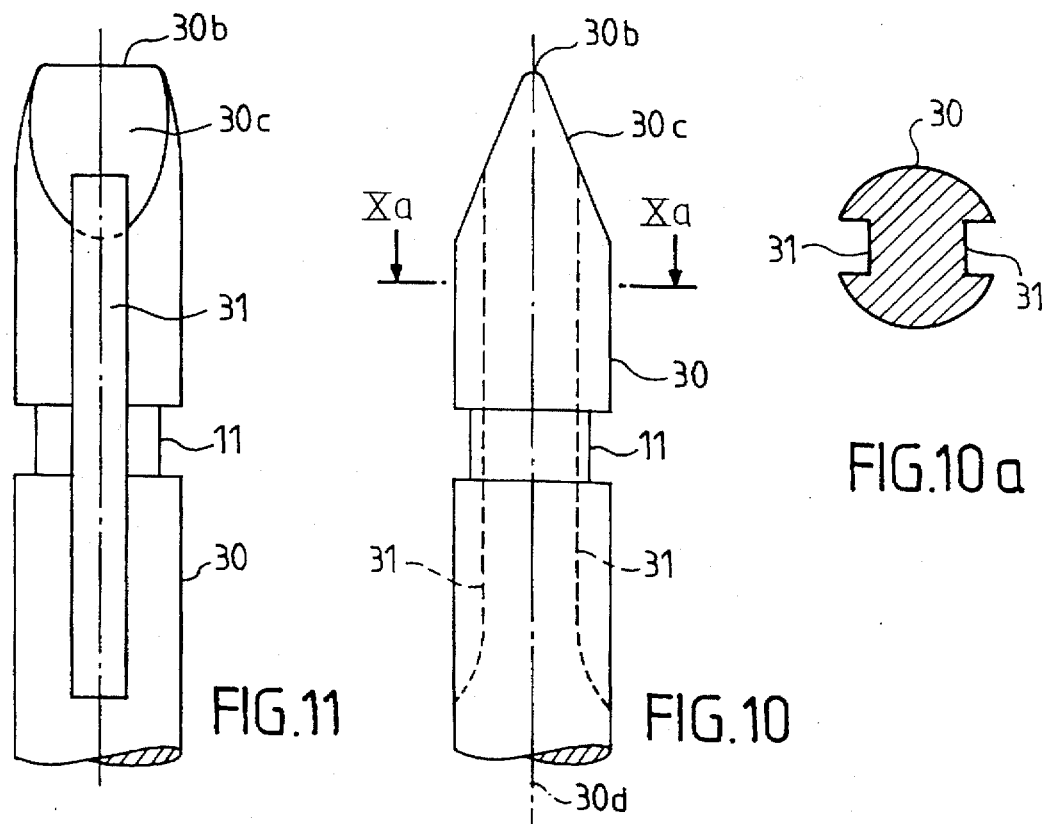

CENTRIFUGE WITH REMOVABLE ROTOR AND DEVICE FOR AXIAL IMMOBILIZATION OF THE ROTOR ON THE DRIVE SHAFT

FIELD OF THE INVENTION

The present invention relates to a centrifuge of the type including a drive shaft, a rotor mounted removably on the shaft, as well as a device for providing drive and axial immobilization of the rotor on the drive shaft. This immobilizing device comprises an elastically loaded male element capable of engaging in a female element such as a retaining recess.

BACKGROUND OF THE INVENTION

A centrifuge of this type is known, in which centrifuge the immobilizing device gives effective axial immobilization of the rotor on the drive shaft only when the rotor is rotating at high speed. This device consists of a tab mounted so that it can move in a widened end of the drive shaft, loaded by a spring and capable of engaging in a groove formed in the rotor. When the rotor rotates at high speed, the centrifugal force applied to the tab keeps the latter pressed against the groove, which affords effective axial immobilization of the rotor.

However, the groove is quite shallow and the tab has a rounded profile so that the rotor can be dismantled when stationary.

As a consequence, at low or even medium rotational speeds of the rotor, the axial immobilization thereof therefore remains unreliable, which gives rise to a not insignificant risk of accident due to chance detachment of the rotor during operation of the centrifuge.

The result of this is that this known embodiment does not guarantee sufficient operational safety for centrifuges equipped therewith.

Furthermore, in the immobilizing device of this known embodiment, owing to the shallowness of the retaining groove, when the rotor is mounted on the shaft the engagement of the tongue in the groove does not have a nature which is positive enough to give rise to a click which is sufficiently sharp and audible that it informs the operator that this engagement has indeed taken place under satisfactory conditions, so that the risk of the operator starting up the rotor and bringing it up to speed while the immobilizing device has not been brought into the engaged position remains. This further increases the risk of accident through chance detachment of the rotor.

Moreover, the construction of this known centrifuge is complicated because it requires a widened part to be produced at the end of the drive shaft, to allow the tab to be fitted.

The documents DE-A-2,722,322 and WO-83/04379 make known coupling systems for axial immobilization of the rotor on the shaft and which are equipped with axial immobilization means that can be unlocked from the outside. DE-A-2,722,322 also makes provision for rotational immobilization of the rotor on the shaft by the engagement of axial slots and ribs. However, these devices require precise manipulation on the part of the operator, failing which the immobilizations may not be provided for, with all the consequences which may stem from this when the centrifuge is made to rotate.

SUMMARY OF THE INVENTION

The first object of the invention is to overcome these drawbacks.

It also aims to provide a centrifuge with detachable rotor, which is equipped with a device capable of providing effective and reliable axial immobilization of the rotor even when the latter is rotating at low speed.

It also aims to provide a rotor-immobilizing device, which, when brought into the engaged position, produces an audible signal of sufficient amplitude for the operator to be informed of the correct engagement of the device when the rotor is mounted on the drive shaft. A visual check is also provided for, owing to the fact that the end of the drive shaft is visible when the rotor is locked.

These objectives are achieved, in accordance with the invention, by the fact the the male element of the immobilizing device is mounted on the rotor and that unlocking means that can be actuated from the outside of the rotor are provided, allowing the operator to place the male element in a position disengaged from the retaining recess and that the free end of the drive shaft exhibits guide means interacting with complementary means integral with the rotor in order, when the drive shaft is engaged in the rotor, to make the rotor pivot about its axis from any arbitrary angular starting position, and descend along the shaft as far as a position in which the rotor is secured in terms of rotation to the shaft and the male element is pushed back elastically into the female element to ensure axial immobilization of the rotor.

By virtue of the presence of these unlocking means that can be actuated from the outside, the male and female elements may be designed with a sufficiently deep profile and an outline such that the engagement of one in the other gives effective immobilization even when the rotor is stationary. This may, for example, be achieved by giving the male element and the female element a rectangular profile so that when the male element is engaged in the female element firm axial immobilization of the rotor with respect to the drive shaft is obtained, which immobilization cannot be eliminated by applying to the rotor a force directed in the direction of detaching the latter from the drive shaft.

The result of this is an increase in the operational safety of the centrifuge.

Moreover, the male element and the female element may be made with a profile of sufficient depth that at the moment when the rotor reaches its mounted position, a click is produced which is sufficiently audible that it informs the operator that locking has indeed engaged.

Furthermore, as the immobilizing device according to the invention is mounted on the rotor, the construction of the drive shaft is simplified.

The immobilizing device in accordance with the invention is advantageously constructed by means of a locking piece mounted integral with the rotor, able to move between a locked position and an unlocked position, elastically loaded towards its locked position and forming both a lock bolt for interacting with a retaining recess of the drive shaft and an operating member that can be actuated from the outside of the rotor making it possible, through mechanical loading on the member, to shift the locking piece against its elastic loading to bring the lock bolt into its position disengaged from the recess.

According to one currently preferred embodiment, the immobilizing device is constructed as follows:

The locking piece is designed to include, on the one hand, a base part which is guided in a slideway and which forms the lock bolt and, on the other hand, an extension part forming the operating member.

The slideway is formed in a lock body which is housed and axially immobilized in an axial recess of the rotor.

Still according to this preferred embodiment, the lock body further serves to provide rotational coupling of the rotor to the drive shaft. To this end, the lock body comprises a piece of annular overall shape, termed drive ring, which is equipped with a profiled recess through which, when the rotor is in the mounted position, there passes part of the drive shaft having a cross section of corresponding shape.

By virtue of this design, the construction of the rotor is considerably simplified since the immobilizing device is not constructed from the actual material of the rotor but is simply attached to the rotor, the latter having to require just an axial recess designed and dimensioned so that it can receive, preferably without play, the lock body equipped with the locking piece. The axial immobilization of the locking body may be provided very simply, for example by means of a circlip.

According to one embodiment of the invention, the slideway comprises a slot formed in the upper face of the drive ring. The lock body additionally includes an auxiliary piece housed in the recess of the rotor and applied against the face equipped with a slot of the drive ring, so as to serve as a member for keeping the locking piece in the slot and thus completing the construction of the slideway receiving the base part of the locking piece.

It is advantageous to design the locking piece and to arrange it in the lock body such that its center of mass is, when this piece is in the locked position, offset with respect to the axis of the rotor in the direction of elastic loading of this piece.

In this way, the centrifugal force which is developed in the locking piece when the rotor rotates at high speed enhances the elastic loading acting continuously on this piece and constitutes the essential means for keeping the lock bolt in the retaining recess of the drive shaft. Thus the operational safety of the centrifuge is increased still further.

Advantageously, the base part of the locking piece has an opening, part of the edge of which forms the lock bolt, this opening, when the rotor is in the mounted position, having the drive shaft passing through it.

According to a specific embodiment of the invention, the rotor includes a handle for gripping, and the operating member, when the locking piece is in the locked position, is arranged close to the handle although there remains between these two elements enough space for movement to allow an operator grasping the handle with one hand to exert, using the same hand, an action on the operating member making it possible to shift the locking piece as far as its unlocked position.

According to another specific embodiment, the handle of the rotor is replaced by a guide wall for an unlocking key, and the locking piece is arranged with respect to the wall such that the operating member, when the locking piece is in the locked position, is positioned close to the guide wall although there remains between these two elements enough space for movement to allow the key sliding along the guide wall to exert an action on the operating member making it possible to shift the locking piece as far as its unlocked position.

It is advantageous to construct the handle or the guide wall using an upwards extension of the auxiliary piece serving to form, with the coupling piece, the slideway on which the locking piece is mounted.

BRIEF DESCRIPTION OF THE DRAWINGS

Further features and advantages of the invention will emerge from reading the description which will follow, which description is given with reference to the appended drawings in which:

FIG. 5 is a diagrammatic part view in elevation and in vertical section showing the rotor of FIG. 1 in mounted position on its drive shaft, its immobilizing device being in the locked position;

FIG. 5a is a diagrammatic part view in horizontal section on the plane Va—Va of FIG. 5;

FIG. 6 is a view similar to FIG. 5 showing the rotor immobilizing device in the unlocked position;

FIG. 6a is a diagrammatic part view in horizontal section on the plane VIa—VIa of FIG. 6;

FIG. 7 is a view identical to FIG. 6 and on a smaller scale additionally including the silhouette of a hand grasping the handle of the rotor and simultaneously placing the immobilizing device in the unlocked position;

FIG. 8 is a view similar to FIGS. 5 and 6 showing a second embodiment of the rotor immobilizing device according to the invention;

FIG. 10 is an elevation view of one embodiment of the drive shaft according to the invention revealing means for guidance in terms of rotation;

FIG. 10a is a cross section of the drive shaft taken on the plane Xa—Xa of FIG. 10;

FIG. 11 is a side elevation view of the drive shaft represented in FIG. 10;

DESCRIPTION OF THE PREFERRED EMBODIMENTS

In the various figures the elements which are identical or similar are denoted by the same references.

Figure 1:
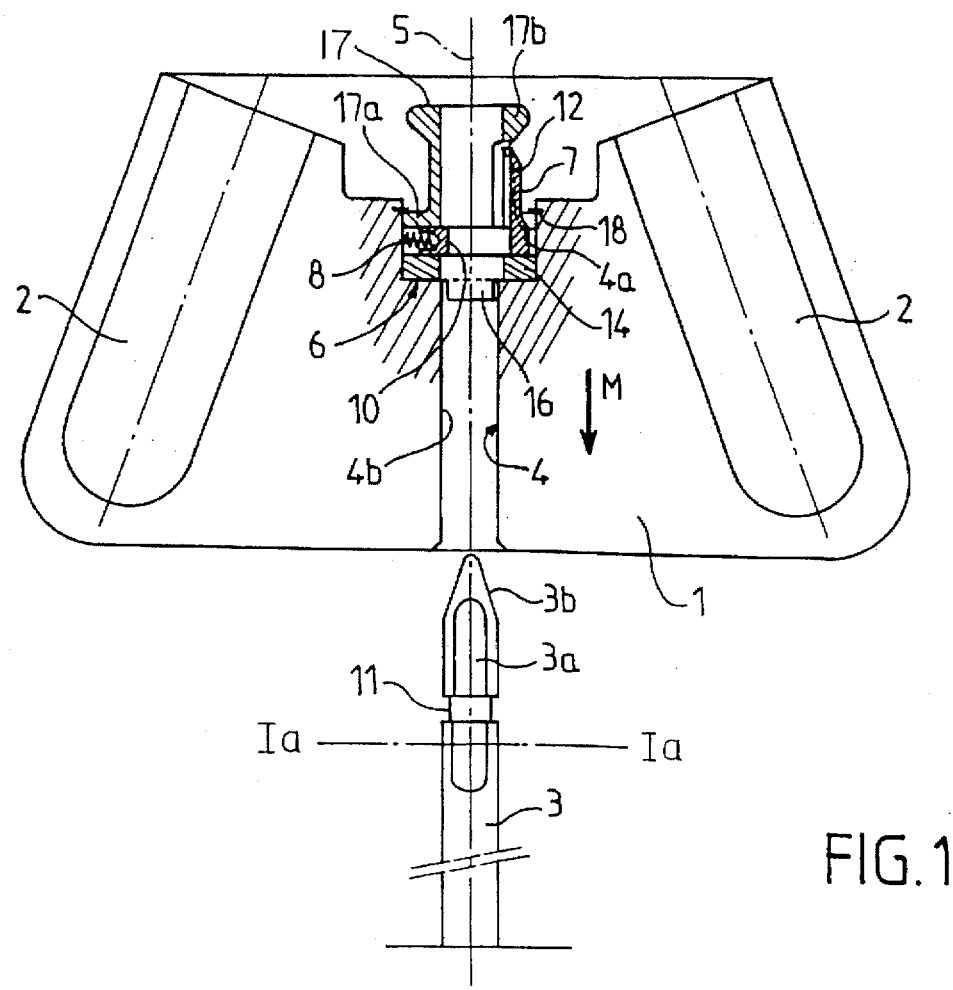
FIG. 1 is a schematic view in elevation and in vertical section showing a rotor equipped with its immobilizing device, and arranged in alignment with and above its drive shaft.
Figure 1A:
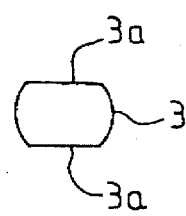
FIG. 1a is a cross section of the drive shaft taken on the plane Ia—Ia of FIG. 1, according to one embodiment of the invention.

According to the example represented in FIG. 1, the centrifuge comprises a rotor 1 including housings 2 for phials or other receptacles intended to contain products to be centrifuged. It also comprises a shaft 3 for driving the rotor 1 in terms of rotation. The shaft 3 is of cylindrical shape with circular section. It is equipped in a region neighboring its free end, with two symmetric flats 3a giving its cross section at this point a substantially rectangular shape (see FIG. 1a).

The shaft 3 exhibits a conical free end 3b ending in a pointed shape. The roles of the flats 3a and of the conical end 3b will be explained later.

A vertical drilling with the overall shape of a counterbore 4 is formed in the rotor 1 coaxial with its axis 5. This drilling is intended to receive the drive shaft 3. The part 4a of greatest section of the counterbore 4 is turned towards the top and it receives an immobilizing device 6 which is described in detail hereinbelow. The part 4b of smallest section of the drilling 4 is intended to receive the shaft 3.

The immobilizing device 6 comprises a locking piece 7 mounted integral with the rotor 1, able to move between a locked position and an unlocked position. The locking piece 7 is elastically loaded towards its locked position by a compression spring 8 bearing against the wall of the part 4a of the counterbore 4 and engaged in a housing 9 of the locking piece 7.

The locking piece 7 simultaneously forms a lock bolt 10 intended to interact with a retaining groove 11 in the drive shaft 3, and an operating finger 12 which can be actuated from outside the rotor.

The lock bolt 10 and the retaining recess 11 both exhibit a profile of rectangular section having sufficient depth that when the rotor 1 reaches its mounted position as represented in FIGS. 5 and 6, introduction of the lock bolt 10 into the recess 11 causes an audible click which is sufficient to inform the operator that the locking device is correctly engaged.

The locking piece 7 includes on the one hand a base part 7a of substantially planar shape, of thickness very slightly less than the height of the retaining groove 11 of the shaft 3 and equipped with a circular opening 7b and, on the other hand, an extension part extending substantially perpendicular to the plane of the base part 7a forming the operating finger 12.

The opening 7b of the base part 7a exhibits a diameter substantially equal to that of the shaft 3. The lock bolt 10 consists of an edge part of the opening 7b.

The base part 7a is guided in a slideway transverse to the axis 5 of the rotor 1. This slideway consists of a slot 13 of rectangular section which is formed in the upper face of a piece 14 of annular overall shape housed in the largest diameter part 4a of the drilling 4 of the rotor.

In addition to its role as aq slideway body, the annular piece 14 serves to couple the rotor 1 to the drive shaft 3 in terms of rotation, and will hereafter be termed a drive ring.

To this end, on the one hand, the ring 14 is arranged in the rotor so as to be integral in terms of rotation with the latter and, on the other hand, it is equipped with a central opening 15 of cross section of rectangular overall shape dimensioned to receive, substantially without lateral play, an end part equipped with flats 3a of the shaft 3. To secure the ring 14 to the rotor 1 in terms of rotation, this ring is equipped with two studs 16 which fit into housings (not represented) formed in the wall of the drilling 4 of the rotor.

An auxiliary piece 17 in the form of a tube open at both ends completes the construction of the device for immobilizing the rotor 1. This piece 17 presses via its lower end 17a on the face equipped with the slot 13 of the drive ring 14. The piece 17 therefore acts as a member for holding the locking piece 7 in the slot 13; it therefore completes the construction of the slideway on which the locking piece 7 is mounted.

A circlip 18 axially immobilizes the elements 14, 7 and 17a which are housed in the recess 4a of the rotor 1.

It is advantageous to design the locking piece 7 and to arrange it in the lock body 14, 17 so that its center of mass is, when the piece 7 is in the locked position, offset with respect to the axis 5 of the rotor 1 in the direction of the elastic loading of the spring 8.

In this way, the centrifugal force which is developed in the locking piece 7 when the rotor 1 is rotating at high speed ensures that the lock bolt 10 is held in the retaining groove 11 of the drive shaft 3, the elastic loading of the spring 8 also continuously acting on this piece. The operational safety of the centrifuge is thus increased still further.

According to the embodiment of FIGS. 1, 5 and 6, the auxiliary piece 17 via its upper end 17b constitutes a handle for gripping the rotor 1. As may be seen in FIGS. 1 and 5, the operating finger 12, when the locking piece 7 is in the locked position, is located close to the handle 17b although there remains between these two elements space for movement which is sufficient to allow an operator grasping the handle 17b with one hand to exert using the same hand an action on the operating finger 12 making it possible to shift the locking piece 7 as far as its unlocked position (see FIG. 7).

The rotor 1 is mounted on the shaft 3 by inserting the latter in the part 4b of smallest section of the axial drilling 4 of the rotor 1. As the upper end 3b of the shaft 3 is conical, on reaching the immobilizing device 6 it will push the locking piece 7 back to place it in the unlocked position.

When the piece 7 comes opposite the groove 11 of the shaft 3, it is shifted to the right by the spring 8, the lock bolt 10 becoming housed in the groove 11, thus axially immobilizing the rotor 1. Engagement of the lock bolt 10 in the groove 11 produces a click which is sufficiently audible to inform the operator that axial locking of the rotor 1 to the shaft 3 has indeed taken place.

Moreover, the shaft 3 is designed and dimensioned so that when the rotor 1 is in its mounted position, its end in the shape of a conical point 3b extends beyond the auxiliary piece 17, this extension providing the operator with the information that axial locking of the rotor 1 has indeed been achieved.

In order to remove the rotor 1 all that is required, s shown in FIG. 7, is to push on the finger 12 to disengage the lock bolt 10 from the groove 11, and to pull the handle 17b up to get the rotor 1 out.

Figure 9:
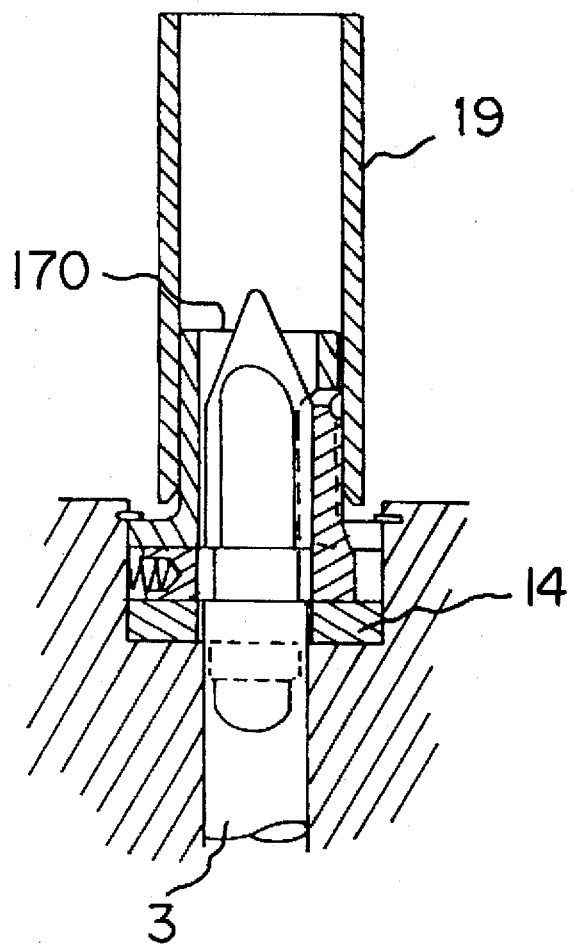
FIG. 9 is a view identical to FIG. 8 and on a smaller scale, showing the unlocking tool in the active position.

The embodiment of FIGS. 8 and 9 differs from that of FIGS. 1, 5 and 6 in that the auxiliary piece 17 via its upper end forms not a handle but a guide tube 170 for a tubular tool 19 serving to bring about the unlocking of the device for immobilizing the rotor 1.

This embodiment is applied especially in cases where the rotor is equipped with a leakproof cover which does not allow a handle to be arranged on the upper face of the rotor.

Here too, the locking piece 7 is arranged with respect to the guide tube 170 so that the operating finger 12, when the locking piece 7 is in the locked position, is positioned close to the guide tube although there remains between these two elements space for movement sufficient to allow the tubular tool slipping along the guide tube to exert an action on the operating finger making it possible to shift the locking piece as far as its unlocked position as is explained hereinbelow.

The tubular tool 19 is dimensioned so as to fit exactly over the guide tube 170. Moreover, it is noted that the operating finger 12 exhibits a free end 12a in the shape of a bevel. Furthermore, the tubular tool 19 exhibits a bevelled wall edge 19a.

Thus, as may be seen in FIG. 9, pressing the tool 19 down over the tube 170 causes the locking piece 7 to be shifted to the left until it is brought into the unlocked position.

With the tool 19 holding itself in the active position for unlocking on the guide tube 170, the operator has both hands free to withdraw the rotor 1 from the shaft 3.

If the centrifuge has a safety device preventing the rotor from being started up if the cover is not closed on the rotor, all that will be required will be to dimension the axial length of the tool 19 such that the cover cannot be closed when this tool is mounted on the tube 170, to draw benefit from complete operational safety.

One embodiment of the guide means for installation ensuring automatic immobilization under all circumstances will now be described with reference to FIGS. 10 to 14. According to this embodiment, these elements are specially designed to fulfil an additional function of guidance making it possible, when the shaft 3 is inserted in the axial drilling 4 of the rotor 1, for the latter not to remain axially immobilized and in equilibrium on the upper end of the shaft 3, but to be made to pivot automatically about its axis 5 and to drop down until it reaches its mounted position and to do so regardless of the angular starting position of the rotor.

The shaft 30 represented in FIGS. 10, 10a and 11 differs from the one represented in FIGS. 1 and 5 to 7 in that on the one hand, its free end is delimited by a double bevel forming an upper ridge 30b and two inclined surfaces 30c which are symmetric with one another with respect to an axial plane 30d of the shaft and, on the other hand, the flats are replaced by two longitudinal and diametrically opposite slots 31 symmetric with one another with respect to the plane 30d. The slots 31 exhibit a rectangular cross section and each extends as far as the lower end of the adjacent inclined surface 30c.

Figure 2:
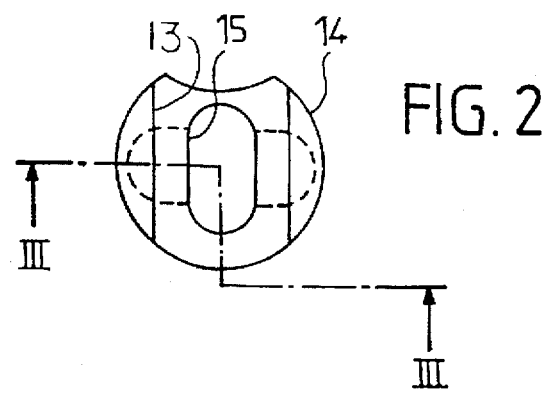
FIG. 2 is a plan view after rotation through 90° of the drive ring of the rotor immobilizing device represented in FIG. 1.
Figure 4:
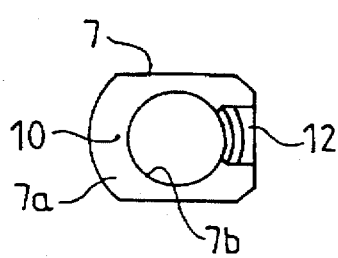
FIG. 4 is a plan view of the locking piece of the rotor immobilizing device represented in FIG. 1.
Figure 3:
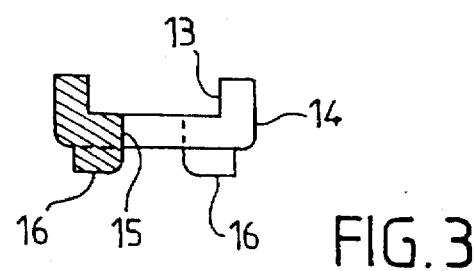
FIG. 3 is a vertical section on the plane III—III of FIG. 2.
Figure 12:
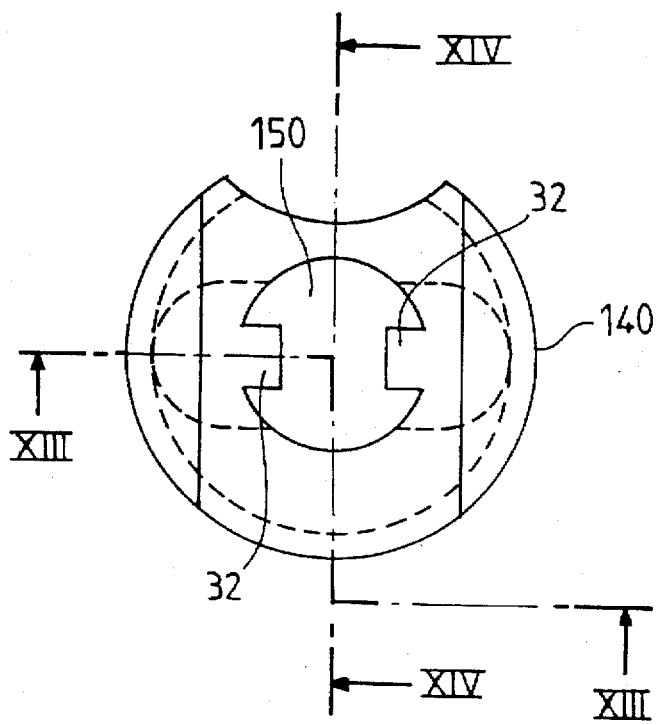
FIG. 12 is a view similar to FIG. 2 representing a second embodiment of the drive ring of the centrifuge corresponding to the embodiment of the drive shaft represented in FIG. 10.
Figure 14:
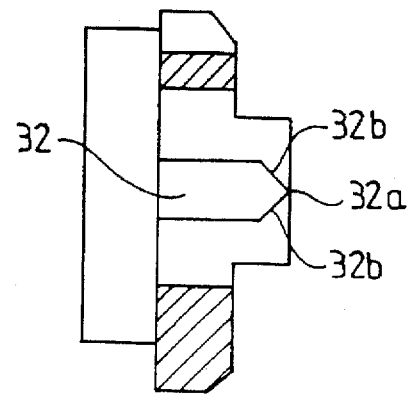
FIG. 14 is a view in elevation and in vertical section on the plane XIV—XIV of FIG. 12.
Figure 13:
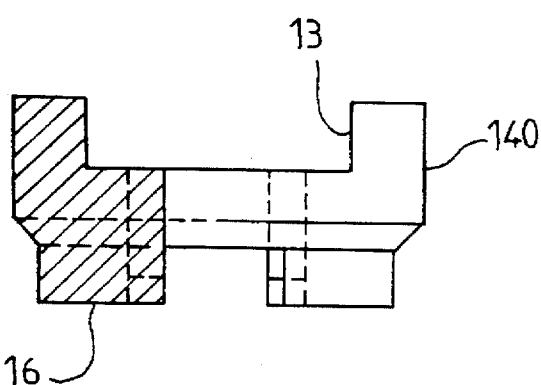
FIG. 13 is a view in elevation and in vertical section on the plane XIII—XIII of FIG. 12.

The drive ring 140 represented in FIGS. 12 to 14 differs from that of FIGS. 2 and 3 in the shape of its central opening 150 which is no longer rectangular but of circular shape delimited by two ribs 32 diametrically opposite each other extending parallel to the axis of the ring 140 and projecting over the internal wall of the central opening 150 of the ring 140. The ribs 32 are of rectangular section and they are arranged and dimensioned so as to be able each to fit substantially without transverse play in a corresponding slot 31 of the shaft 30.

The cross section of the opening 150 equipped with the ribs 32 is dimensioned so as to be able to receive the cross section of the part of the shaft 30 equipped with the slots 31 substantially without transverse play.

In the mounted position of the rotor 1, the ribs 32 are housed in the slots 31 and thus form keys which secure the rotor 1 to the drive shaft 30 in terms of rotation.

As may be seen more particularly in FIG. 14, each rib 32 exhibits a doubly bevelled lower end forming a lower ridge 32a and two inclined surfaces 32b which are symmetric to one another.

By virtue of the configuration which has just been described of the shaft 30 and of the drive ring 140, the rotor 1 can never remain in equilibrium on the shaft 30 at the moment when the bevelled end of the latter reaches the level of the ring 140.

What happens is that when the rotor 1 is lowered for mounting along the shaft 30, the doubly bevelled ends 32a, 32b of the ribs 32 interacting with the doubly bevelled end 30b, 30c of the shaft 30 cause the rotor 1 to rotate about its axis 5 until the ribs 32 are in alignment with the slots 31 of the shaft 30 and begin to engage in the slots 31. The rotor 1 then continues to descend until it reaches its mounted position for which the lock bolt 10 is engaged in the groove 11 of the shaft 30.

When the rotor 1 is offered up for mounting on the shaft 30, it is practically never positioned such that the lower ridges 32a of the ribs 32 are in alignment with the upper ridge 30b of the shaft 30. However, even if that were to be the case, this position is not a stable position and the slippage of the inclined surfaces 32b over the inclined surfaces 30c will mean that the rotor 1 will pivot about its axis 5 while descending along the shaft 30 until it reaches the position for which the ribs 32 are in alignment with the slots 31 and begin to engage in the slots.

The drive ring 140 is advantageously made of a weaker material than the constituent material of the shaft 30, for example made of plastic so that in the event of the rotation of the rotor 1 coming to an abrupt standstill or in the event of other mechanical incidents, the two ribs forming keys 32 shear off without damaging the driving shaft 30.

I claim:

1. A centrifuge comprising:
    a drive shaft having a central axis, said drive shaft including
        a female element, and
        a free end;
    a rotor which is axially received on said drive shaft and moved axially along said drive shaft to a mounted position where said rotor is mounted for rotation with said drive shaft;
    an immobilization means for axially immobilizing said drive shaft with respect to said rotor when said rotor is in the mounted position, said immobilization means including
        a male element movably mounted to rotor,
        a spring means for urging said male element into engagement with said female element when said rotor is in the mounted position, and
        an unlocking means actuatable from outside of said rotor for moving said male element out from engagement with female element against the urging of said spring means when said rotor is in the mounted position; and
    a guide means for automatically pivoting said rotor about the axis of said drive shaft from any arbitrary angular position as said rotor is received on said drive shaft to an angular locking position as said rotor is moved along said drive shaft to the mounted position where said male element is urged into said female element by said spring means, said guide means including
        a first guide on said free end of said drive shaft,
        a second guide which is integral with said rotor and which is complementary to said first guide and interacts therewith.

2. A centrifuge as claimed in claim 1, wherein said male and female elements have complementary profiles which are rectangular.

3. A centrifuge as claimed in claim 1,
    wherein said female element of said drive shaft is a retaining recess;
    wherein said unlocking means is an operating member;
    wherein said male element is a lock bolt;
    wherein said lock bolt and said operating member form an integral locking piece mounted integrally with said rotor, said locking piece being movable in said rotor between a locked position where said lock bolt engages said retaining recess in said drive shaft and an unlocked position in which said lock bolt is disengaged from said retaining recess; and wherein said spring means urges said lock bolt of said locking piece towards the locked position.

4. A centrifuge as claimed in claim 3, wherein said locking piece includes a center of mass which is located offset in the direction of the urging of said spring means from the axis of said shaft when said locking piece is in the locked position.

5. A centrifuge as claimed in claim 4, wherein said rotor includes an axial recess and a lock body housed and immovably received in said axial recess, said lock body including a slideway;

wherein said locking piece further includes a base part including said lock bolt which is mounted in said slideway of said lock body for guided movement; and wherein said operating member is an extension part extending from said base part.

6. A centrifuge as claimed in claim 5, wherein said lock body is an annular piece having a central opening through which said drive shaft passes when said locking piece is in the locked position and a slot transverse to the axis of said drive shaft which forms said slideway; and further including a coupling means for rotationally coupling said annular piece to said drive shaft when said locking piece is in the locked position.

7. A centrifuge as claimed in claim 6, wherein said rotor further includes an auxiliary part, said auxiliary part including:

a handle by which said rotor is gripped by a user, said handle being located adjacent but spaced from said operating member when said locking piece is in the locked position whereby a user grasping said handle with one hand can shift said locking piece from the locked position to the unlocked position; and an inner part which is pressed against said annular piece adjacent said slot therein to retain said locking piece in said slot.

8. A centrifuge as claimed in claim 6, wherein said rotor further includes an auxiliary part, said auxiliary part including:

a guide wall located adjacent but spaced from said operating member when said locking piece is in the locked position; and an inner part which is pressed against said annular piece adjacent said slot therein to retain said locking piece in said slot; and further including an unlocking key which is engagable with said guide wall such that as said unlocking key is engaged with said guide wall said locking key also engages said operating member and moves said locking piece from the locked position to the unlocked position.

9. A centrifuge as claimed in claim 8, wherein said spring means is also for moving said male element into said female element with sufficient force to create an audible signal.

10. A centrifuge as claimed in claim 9, wherein said first guide of said guide means includes a longitudinal slot in said drive shaft and said free end of said drive shaft has two faces which converge to a first end ridge; and wherein said second guide of said guide means includes an axially extending rib in said central opening of said annular piece, said rib having two faces which converge to a second end ridge at an axial end thereof such that said first and second end ridges interact automatically as said rotor is received on said drive shaft to pivot said rotor to the angular locking position where said rib is keyed in said longitudinal slot.

11. A centrifuge as claimed in claim 3, wherein said locking piece includes an opening having an edge;

wherein said drive shaft passes through said opening in said locking piece when said locking piece is in the locked position; and wherein a portion of said edge of said opening of said locking piece forms said lock bolt.

12. A centrifuge as claimed in claim 3, wherein said rotor further includes a handle by which said rotor is gripped by a user, said handle being located adjacent but spaced from said operating member when said locking piece is in the locked position whereby a user grasping said handle with one hand can shift said locking piece from the locked position to the unlocked position.

13. A centrifuge as claimed in claim 3, wherein said rotor further includes a guide wall located adjacent but spaced from said operating member when said locking piece is in the locked position; and further including an unlocking key which is engagble with said guide wall such that as said unlocking key also engages said operating member and moves said locking piece from the locked position to the unlocked position.

* * * * *